(12) United States Patent
Nishimura et al.

(10) Patent No.: US 6,651,731 B2
(45) Date of Patent: Nov. 25, 2003

(54) METHOD FOR COOLING HEATING GRADE HEAT EXCHANGER IN UNSTEADY STATE

(75) Inventors: Takeshi Nishimura, Himeji (JP); Yukihiro Matsumoto, Kobe (JP); Sei Nakahara, Himeji (JP); Motomi Nakamura, Himeji (JP)

(73) Assignee: Nippon Shokubai Co., Ltd. (JP)

( * ) Notice: Subject to any disclaimer, the term of this patent is extended or adjusted under 35 U.S.C. 154(b) by 0 days.

(21) Appl. No.: 10/062,239

(22) Filed: Feb. 1, 2002

(65) Prior Publication Data

US 2002/0104644 A1 Aug. 8, 2002

(30) Foreign Application Priority Data

Feb. 6, 2001 (JP) ......................... 2001-030138

(51) Int. Cl.[7] .................. F25B 29/00; C07C 51/16; C07C 57/02; C07C 51/00
(52) U.S. Cl. .................. 165/58; 165/46; 560/205; 562/545; 562/546; 562/600; 562/598
(58) Field of Search .................. 562/545, 546, 562/600, 598; 560/205; 165/46, 58

(56) References Cited

U.S. PATENT DOCUMENTS 4,365,087 A * 12/1982 Kadowaki et al. .......... 562/534
5,746,892 A * 5/1998 Bauer, Jr. et al. ............. 203/38

* cited by examiner

*Primary Examiner*—Alan L. Rotman
*Assistant Examiner*—Taylor V Oh
(74) *Attorney, Agent, or Firm*—Mathews, Collins, Shepherd & McKay, P.A.

(57) ABSTRACT

For a heat exchanger using a heating medium for the purpose of heating a fluid to be handled during a steady state, this invention provides a method for using relevant devices which enables the heat exchanger to be operated safely and infallibly without suffering the raw material or the reaction product to polymerize in the reactor or the pipes during an unsteady state, suffering the reactor or the pipes to sustain a fracture owing to a rise in the internal pressure of the vessel, and suffering the apparatus for production to sustain serious damage. This invention pertains, mainly in a heat exchanger admitting a heating medium and using it for the purpose of heating a fluid to be handled, to a method for using relevant devices during the unsteady state, characterized by introducing a cooling medium in the place of the heating medium mentioned above.

9 Claims, 4 Drawing Sheets

METHOD FOR COOLING HEATING GRADE HEAT EXCHANGER IN UNSTEADY STATE

BACKGROUND OF THE INVENTION

1. Field of the Invention

This invention relates to a method for cooling a heating grade heat exchanger in an unsteady state and a method for preventing the fluids under treatment in the heat exchanger from polymerizing.

2. Description of Related Arts

Most heat exchangers are utilized with a specific intention of coolers, heaters, etc. for specified substances. No heat exchanger is designed to fulfill a dual-purpose use for heating and cooling operations in itself. Most heat exchangers are intended to be used most efficiently in specific ranges and are rarely used for any other entirely different purpose in an actual plant.

In a plant engaged in producing such an easily polymerizing compound as (meth)acrylic acid or a (meth)acrylic ester, for example, a power failure compels transferring means such as pumps and stirring and mixing means to discontinue their functions and brings the plant to a stop, with the result that the raw material and the reaction product will stagnate in a vessel and pipes used in the plant and the substances so stagnating will polymerize in the cause of the thermal inertia. Also when the plant incurs difficulty in controlling temperature and pressure on account of an accident or an incorrect manipulation in the equipment or of an abnormal performance of the equipment or an abnormal reaction, the consequent failure to effect temperature control by heat exchange or pressure control by degassing entails either a rise in temperature to the extent of polymerizing the raw material and the reaction product in the vessel and the pipes or a rise in inner pressure of the vessel to the extent of inflicting breakage on the vessel and the pipes and possibly giving rise to an explosive combustible material. It is, therefore, a common practice to lay down a manual for emergency measures and provide a mechanism for coping with an emergency in preparation for the occurrence of such an unsteady state.

To prepare the plant for the emergency, a varying mechanism is adopted for enabling solenoid valves and power valves to be switched manually during the life of the unsteady state, for enabling a feed valve for polymerization inhibitor to be manually switched and consequently permitting the inhibitor to be admitted into the reactor and preventing the contents of the vessel from polymerizing, or for enabling the reactor to be forced cooled down with a blower using a compressed gas or an emergency power source or spontaneously cooled down. The mechanism is aimed at protecting the vessel and the pipes against sustaining a fracture and consequently inflicting a serious damage to the plant owing to the polymerization of the raw material and the reaction product in the vessel and the pipes and the rise of the internal pressure of the vessel. An alternative mechanism may be occasionally adopted for effecting forced discharge of the contents of the reactor and the relevant columns from their interiors by means of a pump using an emergency power source or for effecting gravitational discharge of the contents downward from the reactor and the relevant columns through the lower parts thereof by construction of an underground tank.

The direct engagement of an operator in manually manipulating a valve in the proximity of the reactor or in introducing the polymerization inhibitor into the reactor not only entails danger in itself but also exposes the operator to the possibility of inducing a secondary disaster through a personal negligence possibly committed on account of the urge for promptness of work. The operator also has the possibility of failing to take a prompt measure, of taking only a delayed measure in case of an emergency, or of causing a disaster due to a personal negligence. Particularly in the plant for an easily polymerizing compound, the resumption of the operation thereof after the stop possibly takes up a long time because the contents of the reactor are suffered to polymerize in the cause of the thermal inertia. Further, even the forced cooling by the use of a compressed gas or an air blower entails such problems as suffering generation of a polymer, degrading the plant in productivity, and heightening the cost of production because the cooling operation proceeds with poor efficiency and consumes a long time.

Particularly when the fluid being treated for the production in the plant is an easily polymerizing compound, the process for this production is generally furnished with a means for adding to the fluid a polymerization inhibitor for the purpose of precluding the occurrence of polymerization in the unsteady state. The polymerization inhibitor, when added in an unduly large amount, degrades the plant in efficiency of production by entailing such problems as increasing the viscosity of the fluid during the formation of a finished product through redistillation or changing the state such as deposition.

SUMMARY OF THE INVENTION

The present inventor, after pursuing a diligent study repeatedly with a view to fulfilling the object mentioned above has perfected this invention. This invention is aimed at, in a heat exchanger having admitted a heating medium for heating the fluids to be handled therein while the plant is in a steady state, a method for using such devices as are capable of safely and infallibly operating while the plant is in an unsteady state lest they should suffer the raw material and the reaction product to polymerize in the reactor and the relevant pipes, give rise to an explosive combustible material, and suffer the internal pressure of the reactor to rise to the extent of fracturing the vessel and the pipes and consequently inflicting a serious damage on the equipment for production.

Specifically, the object mentioned above is accomplished by the following items (1)–(3).

(1) A method for using a heat exchanger having admitted a heating medium for the purpose of heating a fluid to be handled, characterized by introducing a cooling medium in the heat exchanger in the place of the heating medium during an unsteady state.

(2) A method for preventing an easily polymerizing compound from forming a polymer in a heating grade heat exchanger installed in an apparatus for handling the easily polymerizing compound, characterized by introducing a cooling medium into the heat exchanger in the place of a heating medium during an unstable state.

(3) A method for cooling a fluid to be handled in a heat exchanger having admitted a heating medium for the purpose of heating the fluid, characterized by introducing a cooling medium into the heat exchanger in the place of said heating medium during an unstable state.

These methods are capable of bringing the following effects.

(1) The method allows the number of devices and the installation area thereof to be decreased because the devices used in common with the existing apparatus operating in a steady state and the fluids being handled therein can be cooled. The devices can be quickly and infallibly manipulated without any mistake because their operations are attained simply by switching valves with a low power consumption.

(2) The method, during the course of an unsteady state, is effective in either preventing the contents including the reaction product in the system of the apparatus and the reactor from inducing such an abnormal reaction as polymerization or stopping the abnormal reaction, if induced at all, because the devices can be operated from safe places. Further, the devices can be safely and infallibly operated without suffering the raw material and the reaction product to succumb to polymerization in the vessels and the pipes or causing the internal pressure of the vessels to rise possibly to the extent of fracturing the vessels or the pipes and inflicting serious damage on the apparatus for production.

(3) In the process for the production of an easily polymerizing compound, the method is particularly effective during the course of an unsteady state induced by an abnormality in the columns and the esterification reactor because the possible reaction of polymerization of the easily polymerizing compound can be quickly stopped or abated by introducing into the heat exchanger a cooling medium in the place of a heating medium and consequently cooling the fluids being treated therein. The method, when used in combination with an operation of discharging the fluids, i.e. easily polymerizing compounds, by means of a pump.

BRIEF DESCRIPTION OF THE DRAWINGS

FIG. 1(A) is a schematic diagram illustrating simply the relation between a reactor for the production of (meth)acrylic acid and a air heater to be used in the reactor and FIG. 1(B) is a schematic diagram illustrating one preferred mode of embodiment wherein a heat exchanger constitutes the air heater to be used in the reactor for (meth)acrylic acid depicted in FIG. 1(A).

FIG. 3(A) is a schematic diagram simply showing the relation between a reactor for the production of (meth)acrylic ester and a heater of raw material to be used therein.

FIG. 3(B) is a schematic diagram illustrating one preferred mode of embodiment wherein a heat exchanger constitutes the heater of the raw material to be used in the reactor for the production of (meth)acrylic ester depicted in FIG. 3(A).

DESCRIPTION OF THE PREFERRED EMBODIMENTS

Figure 1:
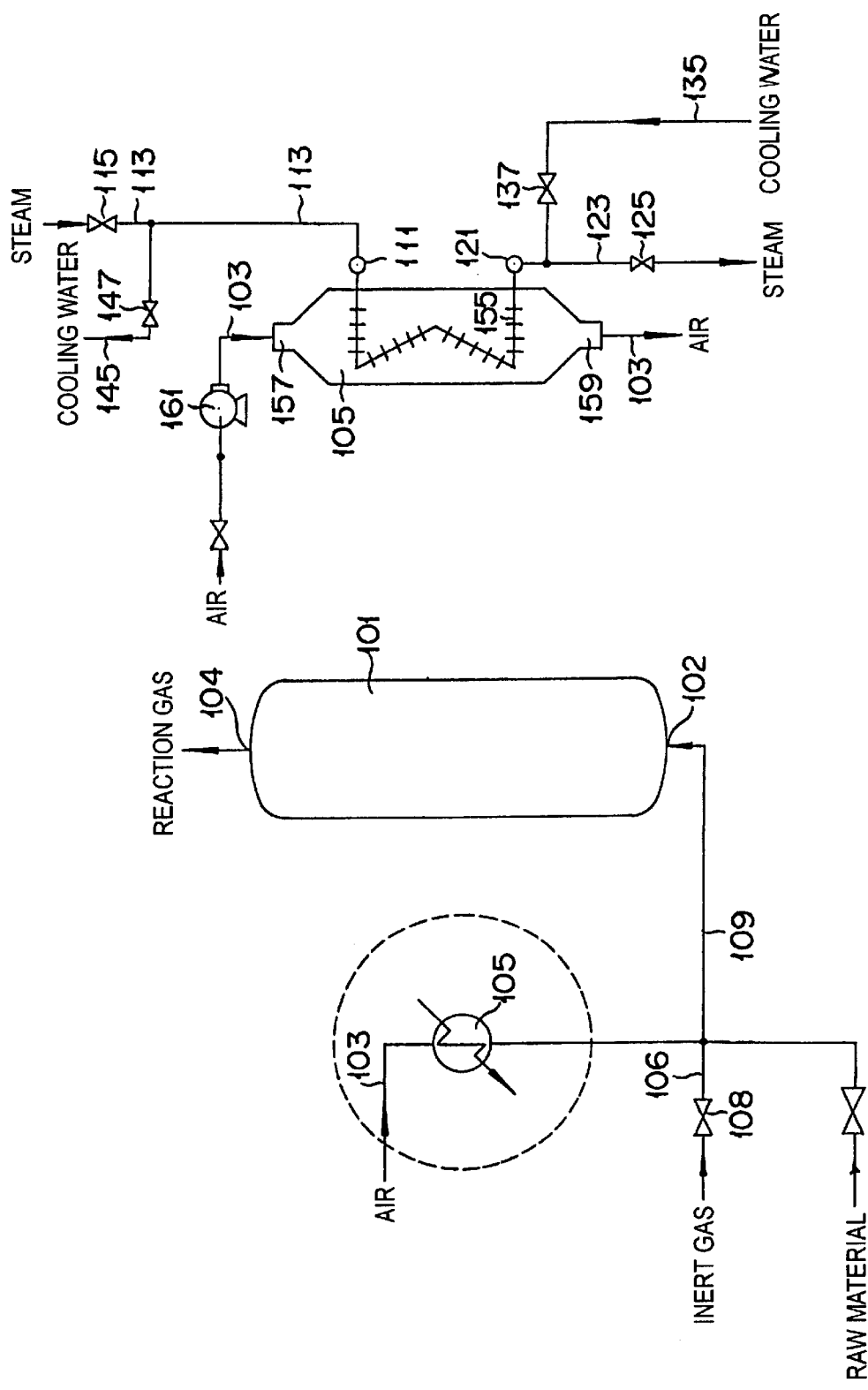
FIG. 1 is a schematic diagram illustrating one mode of embodying the method of this invention.

The method of this invention is mainly applied to a heat exchanger adapted to introduce a heating medium and use it therein for heating fluids being handled therein (hereinafter referred to simply as "a heating grade heat exchanger") and is characterized by introducing a cooling medium in the place of the heating medium mentioned above during the unsteady state. It is, consequently, enabled to obviate the necessity for preparing numerous devices and facilities of such quality as promises extremely limited frequency of use in anticipation of the unsteady state, to prevent the heat exchanger itself from sustaining physical breakage on account of the generation of a polymer or of the increase of pressure, and to preclude the raw material and the reaction product from succumbing to polymerization in such devices as the reactor and the columns and the pipes which participate in the process of production to which the heat exchanger is annexed. The devices relevant thereto can be operated very simply from safe places lest the vessels and the pipes should sustain fracture and the apparatus for production should suffer from serious damage because of the formation of an explosive combustible material or of a rise in the internal pressure of the vessels.

The heating grade heat exchanger mentioned above does not need to be particularly discriminated but is only required to be mainly capable of fulfilling the function thereof by introducing a heating medium for the purpose of heating the fluids to be handled therein. The heat exchanger, however, is preferred to be used in combination with the reactor, for example, which forms the process for the production of an easily polymerizing compound. This combined use is at an advantage in preventing the heat exchanger itself from generating a polymer and in preventing the reactor and other devices included in the apparatus for the process of production from generating a polymer or sustaining fracture due to a rise in pressure or temperature.

As the heat exchanger contemplated herein, any of the various heretofore known types of heating grade heat exchangers may be utilized in its unmodified form. The term "heating grade heat exchanger" as used herein means such a heat exchanger as is operated during the course of continuously forming a product aimed at by introducing a heating medium for heating the fluids to be treated therein throughout the greater part of the period of use thereof. The method of this invention, therefore, is intended not for a batch process but solely for a continuous process. As respects the modifier "continuous" used herein, the case of continuing the supply of the raw material and, as a result, continuing the formation of the product notwithstanding the heating medium is intermittently, sporadically, or periodically introduced into the heater as in the operation of a line using switching valves is embraced in the continuous process.

The term "steady state" as used in the present specification means a period in which the process for production is stably operated, and the term "unsteady state" means such a period other than the period of stable state operation of the process for production as, for example, ① the phase spent in starting up the process for production, ② the phase spent in stopping the process for production, and ③ the phase occupied by the duration of an abnormal situation. The reason for including the phases ① and ② as the unsteady state is that the duration of the startup operation elapsing until a static state is assumed and the duration of the stopping operation do not actually deserve designation of a steady state because the pressure and temperature and the concentration of raw material supplied lack stability and occasionally even threaten possible explosion. As concrete examples of the phase ③, the case in which the control of temperature or pressure and the control of reaction are rendered difficult by the abnormality induced in the apparatus or in the reaction because the devices develop a trouble or receive wrong manipulation and the case in which the transfer means such as a pump, the stirring and mixing means, the heat exchange means such as a heater, and the automatically controlled system are caused to cease functioning in consequence of power failure may be cited, though not exclusively.

This invention is preferred to be promptly implemented when the unsteady state has emerged particularly in the form of emergency situation or abnormal situation and to be provided with a means capable of detecting the unsteady state specified above.

As concrete examples of the means of detection mentioned above, means for detecting a power failure and means for sensing an abnormal sign in the device or the apparatus using the heating grade heat exchanger such as, for example, a means for detecting a sudden rise of liquid temperature or a rise of pressure due to an abnormal progress of the reaction may be cited. Other examples of this means include varying means for detecting abnormality in the device or the apparatus using the heating grade heat exchanger such as, for example, a means for detecting the occurrence of fracture, change of temperature, change of pressure, and change of flow rate in the apparatus due to wrong manipulation. As an example of the means for detecting power failure, a voltage detector may be cited. This voltage detector is preferred to be furnished with a backup system which is capable of automatically switching the power source whose power failure has been detected to an emergency power source. As concrete examples of the means for detecting abnormality in the device or the apparatus using the heating grade heat exchanger, a temperature detector, a pressure detector, a pH detector, a gas leakage detector, a liquid leakage detector, a liquid level detector, and a flow rate detector may be cited. This invention is preferably furnished with an emergency power source, which enables the method of the invention to be implemented by bringing the apparatus to an emergency stop and effecting discharge of the fluids being handled in the apparatus by means of a pump in case of emergency. The detecting means mentioned above can be used not only during the life of abnormality but equally when the process for production is started up or when the process is stopped. As a result, the series of operations from the time of starting up the process for production to the time of stopping the process can be automatically controlled.

The term "heating grade heat exchanger" as used in this specification does not need to be particularly restricted but refers to not merely the heat exchanger in a narrow sense of word which effects heat exchange between a fluid required to increase temperature and a fluid required to decrease temperature for the sake of effective utilization of heat but also the heating quality heat exchange in a broad sense of word which embraces a preheater, a reboiler, a heater, and a vaporizer.

This invention relates in the heat exchanger mentioned above to a method for the use of devices during the course of the unsteady state, characterized by introducing a cooling medium in the place of the heating medium mentioned above. By the method of using the devices as described above, the fluids to be treated can be cooled during the course of the unsteady state. Further, when the fluids to be handled are easily polymerizing compounds or when the heat exchanger is annexed to the apparatus constituting the plant for the production of an easily polymerizing compound, the method can effectively prevent the generation of a polymer in the various component devices of the plant. Thus, the method proves to be applicable to a wide range of heating grade heat exchangers intended for use in the plant for production of the foregoing description. In this case, the fluids to be handled do not need to be limited to easily polymerizing compounds. They may be gases as well as liquids. The fluids which are introduced into the heating grade heat exchanger to be treated therein eventually serve as sources for heating the easily polymerizing compounds at any of the steps in the plant for production. By rapidly cooling these heat sources during the course of the unsteady state, it is made possible to prevent the generation of a polymer safely and readily.

The process of production, when aimed at (meth)acrylic acid or an ester thereof, requires an apparatus for the production of (meth)acrylic acid or an apparatus for the production of a (meth)acrylic ester. The step for production of (meth)acrylic acid, when aimed at a method for catalytic gas phase oxidation, requires a reactor for catalytic gas phase oxidation and, when aimed at a method for purification of (meth)acrylic acid and a method for esterification thereof, requires a heating quality heat exchange annexed to a esterification reactor; a reboiler or a heater annexed to a solvent separating column; and a reboiler, a heater, a vaporizer, or a concentrator annexed such a distillating column as a light boiling separating column, a high boiling separating column, or a dissipating column. In this invention, the easily polymerizing compound does not need to be limited to (meth)acrylic acid and/or a (meth)acrylic ester and consequently the apparatus for the production thereof does not need to be limited to a heating grade heat exchanger. The method of this invention can be applied to a wide range of devices which make use of a heating grade heat exchanger and which are utilized in the apparatuses for production of compounds entailing such problems as inducing the raw material and the reaction product to develop an abnormal reaction due to the thermal inertia during the course of the unsteady state and suffering the devices to sustain fracture or even explosion. Thus, this method can be extensively applied not only to the heating grade heat exchangers utilized in the apparatuses for the manufacture of chemical products but also to the heating grade heat exchangers used in the apparatuses for manufacture of various industrial raw materials and products in the fields of industrial chemistry, electric and electronic industry, communication, transportation, machinery, architecture, civil engineering, and aerospace engineering and of products and raw material compounds in varying industries including the raw materials and the products for medicine and agriculture.

The system design of the heating grade heat exchanger which can be used for this invention, therefore, ought not to be particularly restricted but may be properly selected to suit the purpose of use. As concrete examples of this heating grade heat exchanger, shell-and-tube cylindrical heat exchangers of the floating head type, U-shape tube type, and fixed tube sheet type; double pipe type heat exchangers; single tube type heat exchangers of the coil type; plate type heat exchangers of the plate type and the spiral type; and fin type heat exchangers may be cited. The heating medium mentioned above does not need to be particularly restricted but is only required to be capable of heating the fluids under treatment to necessary temperatures. It may be properly selected to suit the purpose of use. As concrete examples of the heating medium, vapor, steam, heated oil, process fluid, and hot water may be cited. The conditions for the introduction of the heating medium into the heat exchanger. are omitted from description here because the optimum conditions have been already established for varying purposes of use. The heating medium may be supplied through the medium of a known boiler, for example. The heat generated in the apparatus may be effectively utilized by means of heat exchange. A varying means of supply used in the existing apparatus is also available for the introduction mentioned above.

This invention is characterized by introducing into the heating grade heat exchanger a cooling medium in the place of the heating medium mentioned above. The cooling medium used for this purpose is only required to be capable of lowering the temperature of the fluids being handled quickly to a level not so high as to induce various problems mentioned above. As concrete examples of the cooling medium, cooling waters using tap water, industrial water, rain water, well water, under groundwater, and sea water and liquefied ammonia, Freon, and brine may be cited. From such viewpoints as ease of handling, safety, economy, and effect on the environment, the cooling water proves to be favorable. In consideration of the ease with which the operation is resumed after a suspension, this cooling water is preferred to be substantially equal in quality to the heating medium to be used. The temperature of the cooling medium which is introduced during the course of the unsteady state can be properly selected, depending on the kind of the heating grade heat exchanger to be used and the temperature of the heating medium to be used during the course of a steady state. The difference of temperature between the cooling medium and the heating medium is generally in the range of 50–250° C. and preferably in the range of 80–20° C. This restriction requires no observance when the heat exchanger is furnished with an expansion joint or is constructed so as to be endowed with the function of an expansion joint.

The cooling medium may be supplied directly from the system for tap water or industrial water via a pipe line to the heating grade heat exchanger. Otherwise, it may be supplied from a water storage tank which is installed in advance. Particularly for the purpose of ensuring stable supply of industrial water or of the water from a water storage tank even during a period of power failure, it is advantageous to use a feed pump which is so designed as to be started with an external power source only during the startup of a portable engine intended for exclusive use with this feed pump and thereafter to be kept in operation with the portable engine. When the water storage tank is excessively large and the running cost thereof is heavy, the cooling medium may be stored as in an underground tank. This arrangement permits effective utilization of the surface ground which would be otherwise occupied by a water storage tank. Such devices as the feed pump for the cooling medium which is utilized during the course of the unsteady state may be installed in an underground empty space.

Though the conditions for the introduction of the cooling medium into the heating grade heat exchanger cannot be uniquely defined because they are varied with the presence or absence of the restriction on power source, the kind of the heating grade heat exchanger, the purpose of use, the scale of apparatus, and the presence or absence of the discharge of the fluids under treatment as into the underground tank during the course of the unsteady state, they are only required to be capable of avoiding or abating abnormal phenomena within the apparatus. Generally when the cooling medium can be stably introduced by means of a feed pump furnished with a power source or a portable engine, since the fluids to be handled can be discharged from the apparatus by the pump, the amount of the cooling medium required to be introduced can be calculated from the heating surface area of the heating quality of heat exchanger or from the amount of the heat to be exchanged.

Incidentally, where the normal power source has been secured as during the phase of startup of ① or during the operation of stopping of ② mentioned above, it is advantageous to introduce the cooling medium in the place of the heading medium into the heating grade heat exchanger and, at the same time, discharged the fluids under treatment by the use of a feeding means such as the pump from either the heating grade heat exchanger or the device holding the fluid which has undergone heat exchange, though depending on the factors prevailing during the course of the unsteady state. Where only the emergency power source is available as during the phase of ③ mentioned above, it is advantageous to introduce the cooling medium in the place of the heating medium into the heating grade heat exchanger and, at the same time, discharged the fluids under treatment by a feed pump which can be operated with the portable engine or by virtue of gravitational discharge from either the heating grade heat exchanger or from the device holding the fluids having undergone heat exchange. Incidentally, the unit which has served the purpose of discharging the fluids under treatment is preferred to be cooled by means of the cooling medium. For, if this cooling is capable of preventing the fluids from polymerizing, then the effective components remaining intact thereafter will be refined and recovered.

The fluids to be handled in the heating grade heat exchanger mentioned above do not need to be particularly discriminated. A wide range of fluids such as the inert gas supplied to the process of production, the oxidizing gas, the raw material, the product, and the substances which are supplied to a plant for the production of an easily polymerizing compound and are heated by the heat exchanger during the course of a steady state may be subjected to the treatment. As concrete examples of the inert gas, nitrogen gas, argon gas, and carbon dioxide may be cited. As concrete examples of the oxidizing gas, air and oxygen may be cited. The varying raw materials include a raw material gas. This invention manifests its effect efficiently when the raw material or the product is an easily polymerizing compound.

Where (meth)acrylic acid is produced by the reaction of catalytic gas phase oxidation or a (meth)acrylic ester is produced by esterifying the (meth)acrylic acid, for example, the raw materials handled and the reaction products formed at the component stages of the production are included. As concrete examples thereof, propylene, t-butyl alcohol, methyl-t-butyl ether, isobutylene, (meth)acrylonitrile, (meth)acrylic acid, (meth)acrylic esters, 2-ethylhexyl esters, methyl esters, ethyl esters, n-butyl esters, n-propyl esters, isopropyl esters, isobutyl esters, 2-hydroxyethyl esters, N,N-dimethylaminoethyl esters, acetone, and acetocyanhydrin may be cited. Further, since this invention can effectively prevent the occurrence of a polymer by rapidly cooling the fluids to be handled, the effect of this invention is eminent particularly when the fluids to be handled are easily polymerizing compounds. The reason for this eminent effect is that in the apparatus handling easily polymerizing compounds and in the process for producing an easily polymerizing compound as well, the easily polymerizing compounds continuously pass through the steps of oxidation, absorption, separation of solvent, purification, and esterification in the order mentioned. When such an easily polymerizing compound happens to stagnate at any of these steps in an environment which is devoid of a polymerization inhibitor, it readily starts polymerizing because of the stagnation. The polymer is easily generate even in the steady state. It is a common practice to have the distilling column for (meth) acrylic acid provided in the proximity of the top thereof with a cooling device for cooling the distillate containing (meth) acrylic acid. Since the environment involved herein contains a polymerization inhibitor only in a very small amount, the stagnation of (meth)acrylic acid is liable to induce generation of a polymer even in the steady state. When the power source breaks off during the course of the unsteady state and the heater, cooler, pump, etc. cease to operate, the stagnation of the easily polymerizing compound occurs everywhere and the polymer tends to deposit. When the failure of the control unit results in imparting an elevated temperature to the reaction solution in spite of the safety of the power source, the polymerization is readily initiated because it has dependency on temperature. The reaction of polymerization is in the form of a chain reaction and is not easily controlled. Thus, the polymerization is made to proceed rapidly by only a slight change in temperature or in pressure. The act of rapidly cooling the fluids being handled and the easily polymerizing compound in case of emergency, therefore, is very effective in preventing the polymerization. Incidentally, the polymerization in the cooling device mentioned above constitutes a special case in respect that no polymerization inhibitor is contained therein. Generally, the polymerization can be prevented by cooling.

As concrete examples of the "easily polymerizing compound" mentioned above, such carboxylic acids as (meth) acrylic acid, fumaric acid, and maleic acid which have an unsaturated double bond and the esters thereof may be cited. The hydroxyl group-containing compound which forms an ester in combination with a carboxylic acid having an unsaturated double bond mentioned above is preferred to be a lower aliphatic alcohol or a lower alicyclic alcohol each having 1–12 carbon atoms. As concrete examples of the hydroxyl group-containing compound, various alcohols such as methanol, ethanol, n-butanol, isobutanol, sec-butanol, t-butanol, 1-pentanol, 2-pentanol, 3-pentanol, cyclopentanol, 1-hexanol, 2-hexanol, 3-hexanol, cyclohexanol, 1-heptanol, 2-heptanol, 3-heptanol, 1-octanol, isooctanol, 2-ethylhexanol, isononyl alcohol, and lauryl alcohol may be cited. These compounds may be in a linear form or a branched form. They may be used not only singly but also in the form of a combination of two or more members. In this invention, the fluids actually made to flow the interior of the heating grade heat exchanger does not need to be an easily polymerizing compound so long as the heating grade heat exchanger is installed in a device intended to handle an easily polymerizing compound. Though the alcohol as the raw material for the esterification mentioned above, for example, possesses in itself no polymerizing property, the introduction of a cooling medium into a preheater is embraced in the mode of embodying this invention when the alcohol is heated prior to the reaction of esterification and then supplied to the reactor. The reason for this embracement is that since the compound, after being introduced into the reactor, reacts with the easily polymerizing compound and eventually turns into an easily polymerizing compound, the polymerization of the easily polymerizing compound can be efficiently prevented by cooling the compound in question.

For this invention, the fluids being handled or the easily polymerizing compound is only required to contain at least one of the compounds enumerated above, preferably at least one compound selected from the group consisting of acrylic acid, methacrylic acid, and esters thereof. This invention ought not to impose any restriction on what is used in the apparatus for the production of a (meth)acrylic acid and/or a (meth)acrylic ester. Thus, this invention can be made extensively applicable to the apparatuses for producing compounds for the products and raw materials used in all industries and the raw materials or the reaction products of these compounds can be made usable as fluids to be handled in the apparatuses.

In this invention, the heating grade heat exchanger is required to form therein a path adapted to introduce a cooling medium in the place of a heating medium during the course of the unsteady state. The mode of embodying this invention meanwhile resorting wholly to the heating grade heat exchanger will be described below with reference to the annexed diagrams.

FIG. 1 is a schematic diagram illustrating one mode of embodying this invention by the method for using devices. FIG. 1(A) is a schematic diagram showing simply the relation between a reactor for the production of (meth) acrylic acid as an easily polymerizing compound and a device for heating a raw material used therefor. FIG. 1(B) is a schematic diagram illustrating one preferred mode of embodying this invention, wherein the heating grade heat exchanger is a device for heating the raw material to be used in the reactor for the production of (meth)acrylic acid shown in FIG. 1(A).

As illustrated in FIG. 1(A), the process for the production of (meth)acrylic acid is provided with an air feeding line 103 for supplying an oxygen-containing gas to an oxidation reactor 101. This feeding line 103 is provided on the route thereof with a heater 105 using a finned tube type heat exchanger adapted to adjust the oxygen-containing gas to a prescribed temperature. The reaction of catalytic gas phase oxidation in the oxidation reactor 101 is effected by supplying a raw material gas, which is formed by mixing the gasified air heated in the heater 105 with a raw material and an inert gas passed through a valve 108 for adjustment of flow rate and then advanced through an inert gas introducing line 106, into tubes (not shown) in the oxidation reactor via raw material gas feeding inlet 102 into the tubes packed with an oxidizing catalyst and disposed in the oxidation reactor 101. The raw material gas is oxidized in the reactor and the resultant reaction product is discharged through a reaction gas outlet 104.

In this part of the process for production, mainly during the course of the steady state, the air is adjusted to a necessary temperature by the heater 105, introduced into the oxidation reactor 101, and subjected to the reaction of oxidation while the air is conveyed through a raw material supplying line 109 to the oxidation reactor 101.

The inlet and outlet line for the heating medium (steam in this case) during the steady state of the heater 105 and the inlet and outlet line for the cooling medium (cooling water in this case) during the unsteady state are illustrated in FIG. 1(B). As illustrated in FIG. 1(B), for the introduction of the steam during the steady state of the heater 105, an introducing line 113 is connected to a steam introducing part 111 extending to the heater 105. This introducing line 113 is provided on the route thereof with a valve 115.

For the discharge of the steam during a steady state of the heater 105, a steam discharging line 123 is connected to a steam discharging part 121 reaching the heater 105.

For the introduction of the cooling water during the unsteady state of the heater 105, a cooling water introducing line 135 is connected onto the steam discharging line 123 which is interposed between the steam discharging part 121 and a line switching valve 125. The cooling water introducing line 135 is provided on the route thereof with a line switching valve 137.

For the discharge of the cooling water during the unsteady state of the heater 105, a cooling water discharging line 145 is connected onto the steam introducing line 113 of the heater 105 (between the steam introducing part 111 and the line switching valve 115). The cooling water discharging line 145 is provided on the route thereof with a valve 147.

The heater 105 is provided in the interior of the shell thereof with a finned heat-transfer pipe 155. For the purpose of heating the fluid or advancing the cooling medium inside the heat-transfer pipe 155, the heat-transfer pipe is connected at one end thereof to the steam introducing part 111 and at the other end thereof to the steam discharging part 121. For the purpose of enabling the air to be supplied as the shell side fluid of the heater 105 (the fluid under treatment) through the air feeding line 103, the heater is provided on the upper end of the interior of the shell thereof with an air inlet 157 and on the lower end thereof with an air outlet 159. Further, shell side of the heater 105, the inert gas introducing line 106 is connected to the raw material supplying line 109 as illustrated in FIG. 1(A) so that the contents such as the reaction gas and the raw material gas may be quickly replaced with such an inert gas as the $N_2$, then discharged out of the oxidation reactor 101, and displaced with the inert gas during the suspension of the supply of the raw material gas, namely during the course of the unsteady state. Further, for the purpose of blowing a compressed gas via the heater 105 to the oxidation reactor 101 subsequently to the displacement with the inert gas, the heater 105 is provided on the upstream side thereof with a compressor 161. In the present mode of embodiment, the inert gas introducing line 106 has been depicted as a case of causing the inert gas to be fed to the heat exchanger from the downstream side. This invention allows the inert gas to be supplied to the heat exchanger from either the upstream side or the downstream side. The inert gas inlet line may be disposed on the upstream side or on the downward side of the heat exchanger.

In the apparatus constructed as described above, this invention has the air introduced into the heater 105 through the air feeding line 103 during the course of normal operation. For the purpose of adjusting the raw material to the prescribed temperature by the action of heat exchange, the steam introducing line 113 is opened to introduce the steam into the heat-transfer pipe 155 of the heater 105 during the course of normal operation. In this while, the cooling water inlet line 145 is kept closed. That is, during the course of normal operation, the valve 115 on the steam inlet line and the valve 125 on the steam outlet line are opened to introduce the steam into the hating device 105.

In the heater which is provided with the steam inlet and outlet line for use during the course of steady operation, the present mode of embodiment closes the steam inlet and outlet line and opens the cooling water inlet and outlet line by properly switching the relevant valves in an unsteady state. This operation may be performed manually when the lines are designed for manual operation or electrically or manually when the lines are designed for electrical operation. The motorized solenoid valves are generally caused to assume either an opened state or a closed state by the use of compressed air during the course of power failure. Naturally the power source may be secured with an emergency power source in consideration of the possibility of power failure. Further, by the use of (i) the emergency power source during the course of power failure or machine trouble or (ii) the ordinary power source when this power source is available during normal stop or emergency stop, the cooling water may be drawn from the underground water storage tank (not shown) and supplied to the cooling medium inlet and outlet line so as to effect the introduction of the cooling medium into the heat-transfer pipe 155 of the heater 105. More specifically, the cooling water is passed through the cooling water inlet line and then introduced into the heater 105 after a valve 137 on the cooling water inlet line 135 and the valve 147 on the cooling water discharging line 145 have been opened. Meanwhile, the supply of the raw material gas is stopped and the compressed gas is quickly supplied from the compressor 161 via the raw material supplying line 109 to the shell side of the heater 105. As a-result, the compressed gas which has been cooled by exchanging heat with the cooling water inside the heater 105 is supplied through the raw material supplying line 109 into the oxidation reactor 101 to cool the interior of the reactor in a short time and secure safety. In the oxidation reactor 101, it is advantageous to stop the reactor in the case of the unsteady state and to displace quickly the gas in the reactor (the raw material gas and the reaction gas) with the inert gas introduced by opening the valve 108 on the inert gas introducing line 106 illustrated in FIG. 1(A). In this case, the interior of the heater 105 and the interior of the oxidation reactor 101 can be cooled enough by continuing the introduction of the cooling water for a certain length of time instead of continuing it for a long time. As a result, the possibility of the raw material gas and the reaction gas existing in the heater 105 and the oxidation reactor 101 being induced to react with each other owing to the thermal inertia from the heat-transfer pipe 155 or the oxidation reactor 101 or the vessels and the pipes being fractured owing to the rise of the internal pressure can be avoided. The emergency power source is adopted herein with a view to further embracing the actuation of the portable engine of the cooling water supplying pump and the compressor as by the use of a liquid fuel such as gasoline or kerosene.

During the power failure or machine trouble (i) mentioned above, it is necessary to secure power source and fuel for the operation of the cooling water supplying pump and the compressor for a period sufficient for cooling the interior of the heater 105 and the interior of the oxidation reactor 101. Since the steam is introduced through the steam introducing line 113 during normal operation, the closure of all the valves 115 on the introducing line during the course of the unsteady state possibly suffers the internal pressure of the steam introducing line to remain at a high level and consequently renders the subsequent introduction of the cooling water difficult. In this case, the introduction of the cooling water may be attained by opening the valve 125 on the steam (or water) discharging line prior to the introduction of the cooling water, releasing the internally entrapped steam and relieving the internal pressure, and thereafter closing the valve and then commencing the introduction of the cooling water. Since the introduction of the cooling medium is attained by the use of the heating medium inlet path which is intended for exclusive use during the course of the steady state, it is made possible to shorten the path of pipe for cooling, promote the advantage of design, and cut the cost of production. Particularly when the heating medium is steam and the cooling medium is cooling water, they possibly assume different states during the course of use, though they are equal in quality during the course of the steady state. Even in this case, the method of this invention enjoys very high practicability because the cooling medium can be introduced stably by the switching of the valves 125 in the manner described above.

Incidentally, in the present mode of embodiment, the valves to be switched and the pumps to be started when the heating medium is switched to the cooling medium during the course of the unsteady state may be operated manually or automatically. While FIG. 1 depicts the case of allowing the interchanges, steam (heating medium) inlet=cooling water (cooling medium) outlet and the steam outlet=the cooling water inlet, the present mode of embodiment does not need to be particularly restricted thereto but may allow the interchange between the inlet, outlet for the cooling water and the inlet, outlet for the steam (heating medium), i.e. the steam (cooling medium) inlet=cooling water (cooling medium) inlet and the steam outlet =the cooling water outlet. This choice of the path for the introduction similarly applies to the other diagrams.

When the heating medium is steam, the pipings are generally so laid as to introduce the steam from the upper part and discharge the condensate from the lower part. For the purpose of introducing the cooling medium in the place of the steam in case of emergency, the introduction may be made from the lower part and the discharge from the upper part. In any event, this invention enables the gas stagnating in the interior to be quickly discharged together with the cooling medium by feeding the cooling medium upward and effects the cooling at no sacrifice of the efficiency of heat transfer even in case of emergency.

Figure 2:
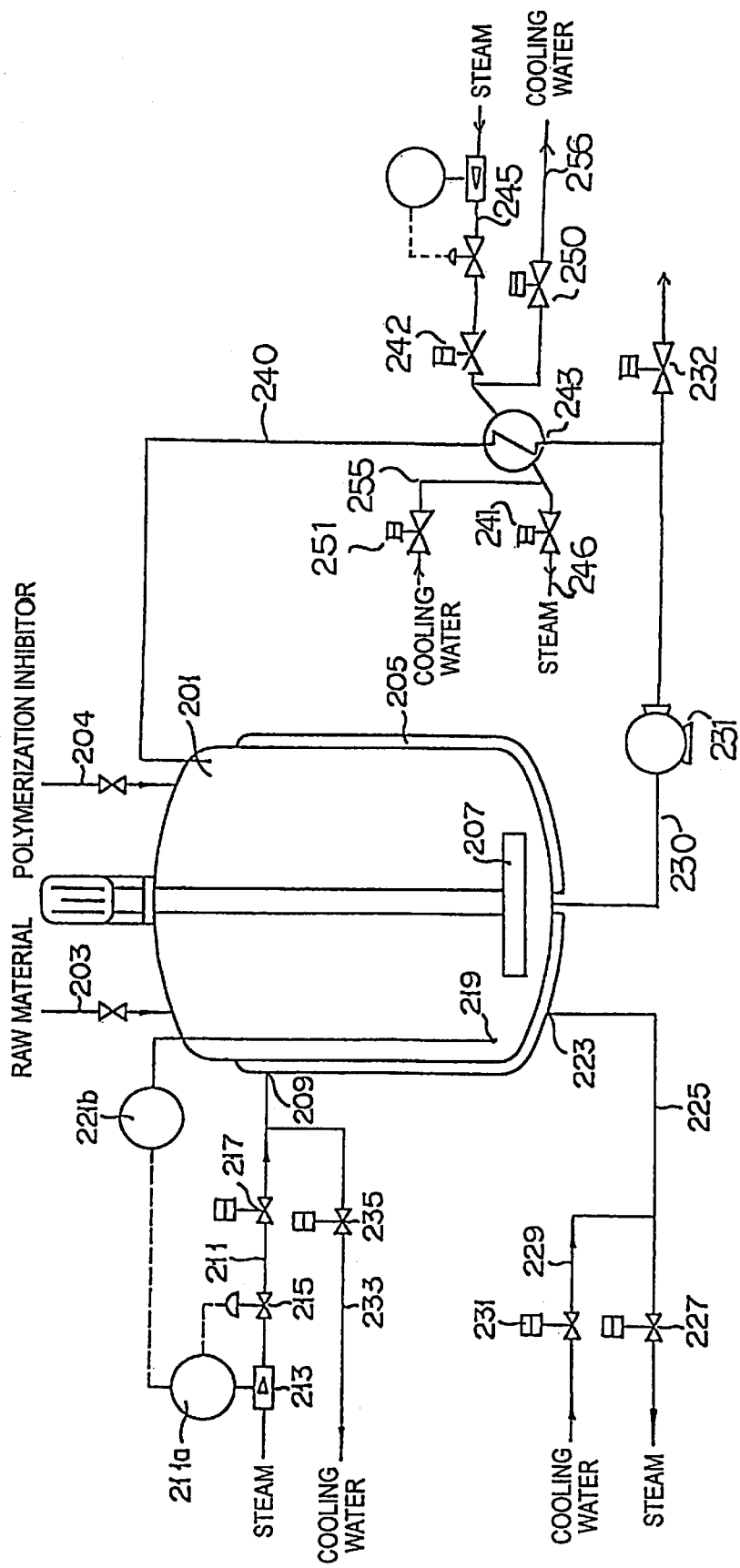
FIG. 2 is a schematic diagram illustrating one preferred mode of embodiment wherein a heat exchanger constitutes the reactor for the production of (meth)acrylic ester as one preferred embodiment of the method of this invention.

FIG. 2 is a schematic diagram illustrating one preferred mode of embodying the method of this invention, wherein the heating grade heat exchanger is an esterification reactor for the production of a (meth)acrylic ester.

The process for the production of a (meth)acrylic ester, as illustrated in FIG. 2, is provided with a raw material supplying line 203 reaching an esterification reactor 201. This raw material supplying line 203 is provided therein with a switching valve. The esterification reactor 201, for the purpose of adjusting the temperature of the interior of the reactor, has attached to the outer periphery thereof a heating jacket 205 for introducing the heating medium and putting it to use. Further, the esterification reactor 201 is provided with a propeller type agitator 207. For the purpose of preventing the fluid retained in the esterification reactor 201 from polymerizing during the course of the unsteady state, the esterification reactor 201 is provided thereon with an emergency polymerization inhibitor supplying line 204. This emergency polymerization inhibitor supplying line 204 is provided with a switching valve.

In this part of the process of production, the raw material is fed through the raw material supplying line 203 into the esterification reactor 201 during the course of a steady state and subjected therein to the reaction of esterification. This reaction of esterification is effected by introducing the steam to the heating jacket 205 and adjusting the internal temperature of the esterification reactor 201 to a necessary level while keeping the agitator 207 in motion.

The inlet and outlet line for the heating medium (the steam in this case) during the course of a steady state and the inlet and outlet line for the cooling medium (the cooling water in this case) during the course of the unsteady state with respect to the heating jacket 205 are also depicted in FIG. 2. For the introduction of the steam to the heating jacket 205 during the course of the steady state, an introducing line 211 is connected to a steam introducing part 209 of the heating jacket 205. This introducing line is provided on the route thereof with a flow rate detector 213, a flow rate adjusting valve 215, and a switching valve 217 for switching the lines. The esterification reactor 201 is provided in the interior thereof with a temperature detector 219. These flow rate detector 213, flow rate adjusting valve 215, and temperature detector 219 are connected to a controlling part (a controlling unit possessed of a flow rate indication adjusting meter 221a and a temperature indication adjusting meter 221b). The controlling part may be connected to line switching valves 217, 227, 231, and 235. Owing to this arrangement, it is made possible to operate these line switching lines quickly and simple the method of this invention when the temperature detector has sensed an abnormal sign of the internal temperature of the esterification reactor 201. In the diagram, the circuits of the control system are shown with a broken line and the lines of piping with a solid line.

For the discharge of the steam from the heating jacket 205 during the course of a steady state, a steam discharging line 225 is connected to a steam discharging part 223 of the heating jacket 205. This steam discharging line 225 is provided on the route thereof with the switching valve 227 for switching the lines. The reaction product in the esterification reactor 201 is discharged out of the vessel via a switching valve 232 by the use of the pump 231 annexed to a reaction product recovering line 230 which is set in position in the bottom part of the reactor.

If the esterification reactor 201 has an unduly large size and the surface area of the reactor decreases relative to the inner volume thereof, the heating solely from the heating jacket 205 will possibly fail to supply an amount of heat sufficient for the reaction of esterification. In this case, the reaction solution may be discharged to the exterior of the esterification reactor 201, heated by the heater annexed to the esterification reactor 201, and then circulated to the esterification reactor 201. For example, a line 240 may be ramified from part of the reaction product recovering line 230 and extended into the esterification reactor 201. The line 240 is made to incorporate therein a heater 243 capable of being heated by means of a valve 241 disposed on a line 246 and a valve 242 disposed on a line 245. Necessary heat exchange is attained by supplying the steam through this line. The reaction solution which has been introduced into the heater 243 is heated and then circulated to the upper part of the esterification reactor 201.

Meanwhile, for the introduction of the cooling water to the heating jacket 205 during the course of the unsteady state, a cooling water introducing line 229 is connected onto the steam discharging line 225 emanating from the heating jacket 205 (between the steam discharging part 223 and the switching valve 227 for switching the lines). This cooling water introducing line 229 is provided on the route thereof with the switching valve 231 for switching the lines. Then, for the discharge of the cooling water from the heating jacket 205 during the course of the unsteady state, a cooling water discharging line 233 is connected onto the steam introducing line 211 extending to the heating jacket 205 (between the steam introducing part 209 and the switching valve 217 for switching the lines). The cooling water discharging line 233 is provided on the route thereof with the switching valve 235 for switching the lines. Then, the heater 243 is provided with lines 255, 256 which are ramified respectively into lines 246, 245 so as to allow the supply of the cooling water as required. The lines are provided with valves 251, 250.

In the apparatus constructed as described above, this invention feeds the raw material through the raw material supplying line 203 into the esterification reactor 201 and subjects it to a reaction of esterification with the agitator 207 kept in motion. In this case, for the purpose of adjusting the temperature of the raw material in the esterification reactor 201 by the action of heat exchange due to the introduction of the steam into the heating jacket 205, the steam inlet and outlet line is opened during the course of a steady operation to introduce the steam into the heating jacket 205 of the esterification reactor 201. In this while, the cooling water inlet and outlet line is kept in a closed state. That is, during the course of a steady operation, the steam is introduced into the heating jacket 205 by keeping the valves 215, 217 on the steam introducing line and the valve 227 on the steam discharging line in an opened state and keeping all the other valves in a closed state. Then, by performing an arithmetic operation in the controlling part and actuating the flow rate adjusting valve 215 based on the output from the temperature detector 219 and the output from the flow rate detector 213, the flow rate of the steam to be introduced is controlled so that the liquid temperature in the esterification reactor 201 will always fall within a prescribed range. The external heater 243, when necessary, may be left unused. When it is put to use at all, the heating medium is supplied to the heater 243 after the valves 241 and 242 have been opened, caused to heat the reaction solution, and then circulated to the reactor through the upper part thereof. Part of the reaction product is discharged out of the valve 232 as a finished product.

In the heating jacket 205 of the esterification reactor 201 and the heater 243 which are provided with the steam inlet and outlet line for exclusive use during the course of a steady operation and the external heater 243, the present mode of embodiment switches the valves, closes the steam inlet and outlet line, and opens the cooling water inlet and outlet line. These manipulations may be performed manually or electrically. The motorized solenoid valves are generally made to assume either of the opened and the closed states by being switched with compressed air in the absence of electric supply. The apparatus is preferred to have secured an emergency power source in advance similarly to the apparatus of FIG. 1. In any event, the cooling water is introduced into the heating jacket 205 of the esterification reactor 201 by drawing the cooling water from the underground water storage tank (not shown) and forwarding it to the cooling water inlet and outlet line. To be specific, the introduction of the cooling water into the heating jacket 205 is effected after opening the line switching valve 231 on the cooling water introducing line 229 and the line switching valve 235 on the cooling water discharging line 233 and closing all the other valves. As a result, the contents of the esterification reactor 201 can be curbed from generating a polymer owing to the thermal inertia and consequently can be cooled efficiently. In this case, for the purpose of preventing the contents of the esterification reactor 201 from succumbing to polymerization while avoiding the discharge thereof out of the system, the contents of the esterification reactor 201 cannot be cooled unless the introduction of the cooling water is continued for a comparatively long time. Thus, the act of operating the portable engine similarly to the apparatus of FIG. 1 and using the emergency power source for the purpose of actuating the engine during the start of the pump proves to be advantageous in the sense that the otherwise inevitable addition to the size of the emergency power source can be repressed.

Then, in the present mode of embodiment, it is permissible to cool the contents of the esterification reactor 201 and meantime prevent them from polymerizing by introducing the cooling water in the place of the steam, continuing the operation of the agitator 207, further opening the valve on the emergency polymerization inhibitor supplying line 204 as occasion demands, and supplying the emergency polymerization inhibitor into the esterification reactor 201.

Further, in the present mode of embodiment, the reaction solution can be more quickly cooled by closing the valves 246 and 242, then opening the valves 251 and 250 disposed on the lines 255 and 256 thereby supplying the cooling water to the external heater 243 in the place of the steam intended for introduction into the external heater 243, and passing the reaction solution therethrough. In this case, the reaction solution may be cooled and then discharged from the system through the valve 232. In the place of the line 240 laid out as described above, an underground tank (not shown) which is formed by providing in the lower part of the esterification reactor 201 with a switching mechanism (not shown) and, at the same time, providing directly below the lower part of the esterification reactor 201 with a switching mechanism adapted to operate synchronously with the switching mechanism mentioned above may be incorporated. As a result, the contents of the esterification reactor 201 can be discharged by gravitational attraction in case of emergency. Alternatively, a structure such that the lower part of the heating jacket 205 is opened and part of the cooling medium in the heating jacket 205 is allowed to flow down into the underground tank by opening the switching mechanism subsequently to the discharge may be adopted. By this arrangement, the raw material and the reaction product which have flowed down into the underground tank can be quickly cooled. It is permissible for the whole amount of the cooling water for introduction into the heating jacket 205 to be thrown into the underground tank through the lower opening of the heating jacket 205. The esterification reactor 205 can be cooled in a short time by being left standing at rest because the interior thereof is vacated substantially completely. Thus, the possibility of the contents remaining deposited on the inner wall part of the esterification reactor 201 succumbing to polymerization is scarce. The contents are solidified by polymerization only sparingly and the utilization of the active components is attained easily when the interior of the underground tank is cooled enough to repress the reaction of polymerization.

Figure 3:
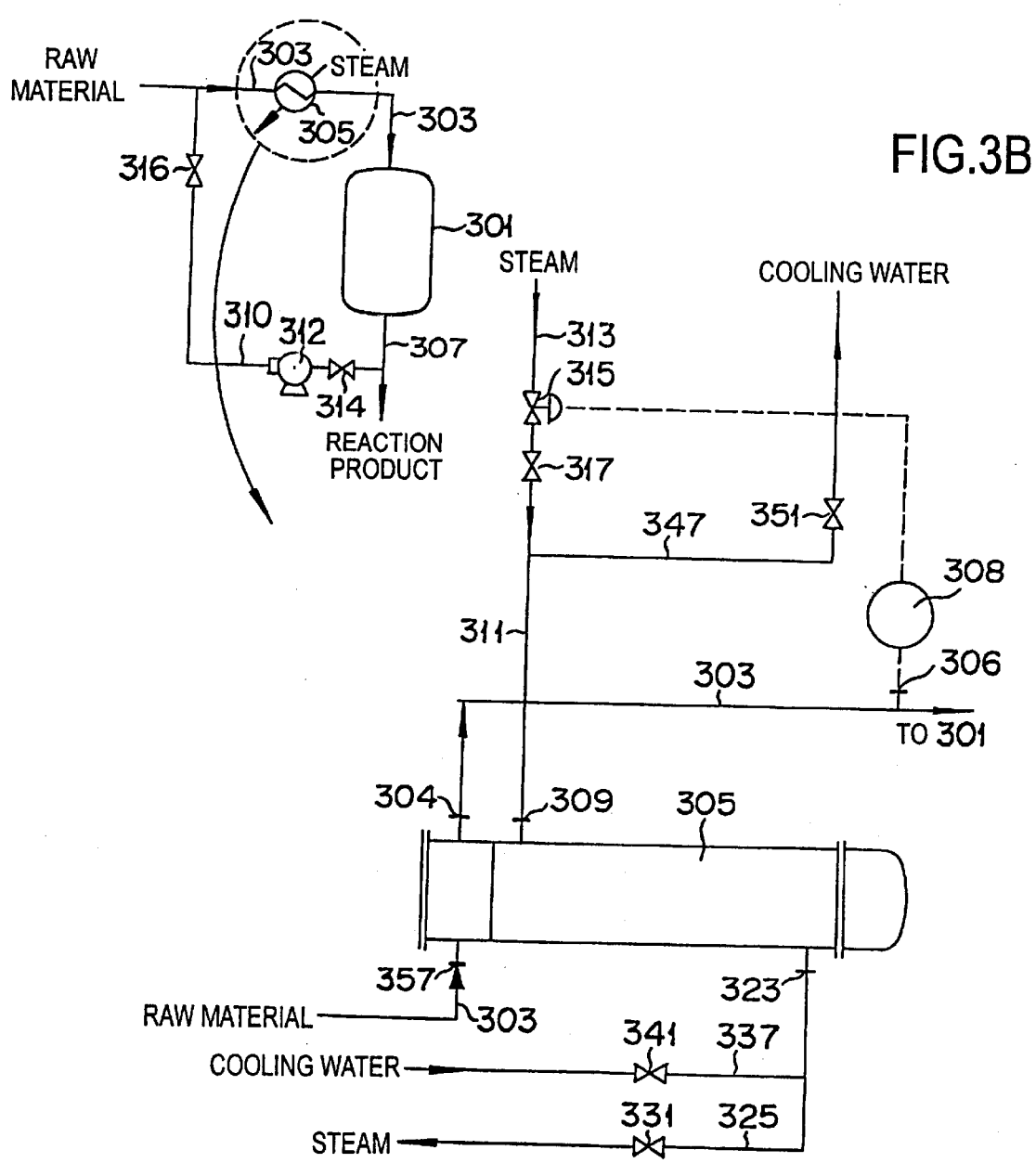
FIG. 3 is a schematic diagram illustrating one mode of embodiment of the method for using the devices of this invention.

FIG. 3 is a schematic diagram illustrating one mode of embodiment of this invention which consists in a method for using devices. FIG. 3(A) is a schematic diagram showing simply the relation between the reactor for the production of a (meth)acrylic ester and the heater of the raw material used for the reactor and FIG. 3(B) is a schematic diagram illustrating one preferred mode of embodiment, wherein the heating quality heat exchange mainly serving to admit the heating medium and use it for the purpose of heating the fluid being handled is the heater for the raw material which is used in the reactor for the production of a (meth)acrylic ester shown in FIG. 3(A).

The process for the production of a (meth)acrylic ester, as illustrated in FIG. 3(A), is provided with a raw material supplying line 303 extending to an esterification reactor 301. This supplying line 303 is provided on the route thereof with a heater 305 using a fixed tube sheet type heat exchange intended to adjust the raw material to a prescribed temperature. A reaction product withdrawing line 307 for discharging the reaction product (the product of esterification) produced in an esterification reactor 301 is connected to the lower part of the esterification reactor 301.

The reaction product withdrawing line 307 is preferred to be provided on the route thereof with a liquid circulating line 310 intended for exclusive use during the course of the unsteady state for the purpose of enabling what has been withdrawn from the reactor 301 to be returned onto the raw material supplying line 303 located farther forward than the heater 305, so that the contents of the esterification reactor 301 and the heater 305 will be circulated in case of unsteady state. The liquid circulating line 310 is preferred to be provided on the route thereof with a circulating pump 312 and switching valves 314 and 316.

In this part of the process of production, the raw material is adjusted to a prescribed temperature by the heater 305, introduced into the esterification reactor 301, and subjected to a reaction of esterification while the raw material is transferred via the raw material supplying line 303 to the esterification reactor 301 during the course of the steady state. The heating medium (the steam in this case) inlet and outlet line for use during the course of the steady state of the heater 305 and the cooling medium (the cooling water in this case) inlet and outlet line for use during the course of the unsteady state are illustrated in FIG. 3(B).

For the introduction of the steam during the course of the steady state of the heater 305, an introducing line 311 is connected to a steam introducing part 309 extending to the heater 305 as illustrated in FIG. 3(B). This introducing line 311 is provided on the route thereof with a steam flow rate adjusting valve 315 and a line switching valve 317. The raw material supplying line 303 on the raw material outlet 304 side of the heater 305 is provided on the route thereof with a temperature detector 306. The temperature detector 306 and the steam flow rate adjusting valve 315 are connected to a controlling part (the controlling apparatus provided with a temperature adjusting meter 308).

The controlling part is further connected to line switching valves 317, 331, 341, and 351. By this arrangement, the line switching valves can be quickly operated and the method of this invention can be implemented as soon as the temperature detector senses an abnormal sign of the temperature of the raw material on the raw material outlet 304 side. When the heat exchanger illustrated in FIG. 3 is utilized as an esterification reactor, the raw material withdrawing line serves as a reaction product withdrawing line and, even by this fact alone, the abnormal sign of the reaction product can be quickly detected. In this case, the provision of a temperature detector in the esterification reactor similarly to the structure of FIG. 2 proves to be excellent in the sense of quickly detecting an abnormal sign. For discharging the steam during the course of the steady state of the heater 305, a steam discharging line 325 is connected to a steam discharging part 323 extending to the heater 305.

For the introduction of the cooling water during the course of the unsteady state of the heater 305, a cooling water introducing line 337 is connected onto the steam discharging line 325 of the heater 305 (between the steam discharging part 323 and the line switching valve 331). This cooling water introducing line 337 is provided on the route with the line switching valve 341. For discharging the cooling water during the course of the unsteady state of the heater 305, a cooling water discharging line 347 is connected onto the steam introducing line 311 of the heater 305 (between the steam introducing part 309 and the line switching valve 317). This cooling water discharging line 347 is provided on the route thereof with the line switching valve 351. In the diagram, the circuits of the controlling system are indicated with a broken line and the lines (paths) of pipes are indicated with a solid line.

The heater is provided in the shell thereof with a raw material inlet 357 and a raw material outlet 304 so that the raw material will be supplied as an internal fluid through the raw material supplying line 303 to the heater 305, adjusted to a prescribed temperature by means of heat exchange, and withdrawn. A heat-transfer pipe (not shown) for passing the internal fluid is disposed. For the purpose of utilizing the steam or the cooling water as an external fluid, a steam introducing part 309 and a steam discharging part 323 are provided for the heater 305.

In the apparatus constructed as described above, this invention mainly introduces the raw material through the raw material supplying line 303 into the heater 305 during the course of a steady operation. For the purpose of adjusting the raw material to a prescribed temperature by the action of heat exchange, the steam inlet and outlet line is opened to introduce the steam to the exterior of the heat-transfer pipe of the heater 305 during the course of a steady operation. In this while, the cooling water inlet and outlet line is kept in a closed state. That is, during the course of a steady operation, the introduction of the steam into the heater 305 is attained by opening the valves 315 and 317 on the steam introducing line and the valve 331 on the steam discharging line and closing all the other valves.

It is permissible to introduce the cooling water in the place of the steam into the heater 305 during the course of the unsteady state and, when necessary, to close the switching valve (not shown) of the reaction product withdrawing line, open the switching valves 314 and 316 of the liquid circulating line 310, and operate the circulating pump 312 so as to induce circulation of the contents thereof and forced passage thereof through the heater 305 for the purpose of circulating the liquids of the heater 305 and the esterification reactor 301 and consequently expediting the cooling of the whole of the content without allowing the internal solution to polymerize.

Further, in the heater provided with the steam inlet and outlet line as described above for exclusive use during the course of a steady operation, the present mode of embodiment the steam inlet and outlet line is closed and the cooling water inlet and outlet line is opened by manipulating the switching valves. These manipulations may be implemented manually or electrically or by the use of an emergency power source. To be specific, the introduction of the cooling water as an external fluid of the heater 305 into the cylinder of the heater 305 by drawing the cooling water from the underground water storage tank, for example, (not shown) and passing it through the cooling water inlet and outlet line. It suffices to pass the cooling water through the cooling water introducing line, open the valve 341 on the cooling water introducing line 337 and the valve 351 on the cooling water discharging line 347, and introduce the cooling water into the heater 305. By this arrangement, it is made possible to prevent the reaction of polymerization and consequently avoid the problems attendant upon the polymerization. In the present mode of embodiment, the interior of the heater 305 can be cooled by introducing the cooling water to a certain extent. This cooling does not need to be continued for a long time. Thus, it suffices to secure electricity in an amount enough to fulfill the purpose of preventing the polymerization. By computing the necessary amount of electricity in advance, it is made possible to decrease the size of the emergency power source or the portable engine. Even in the present mode of embodiment, since the steam is introduced from the steam introducing line during the course of the steady operation, the closure of all the valves on the introducing line during the course of the unsteady state compels the internal pressure of the steam introducing line to remain at a high original level. When this situation entails such problems as rendering the introduction of the cooling water difficult subsequently, the introduction of the cooling water may be effected after the valves on the steam withdrawing line have been opened prior to the introduction of the cooling water to discharge the steam entrapped therein and relieve the internal pressure and the valves have been closed subsequently.

Figure 4:
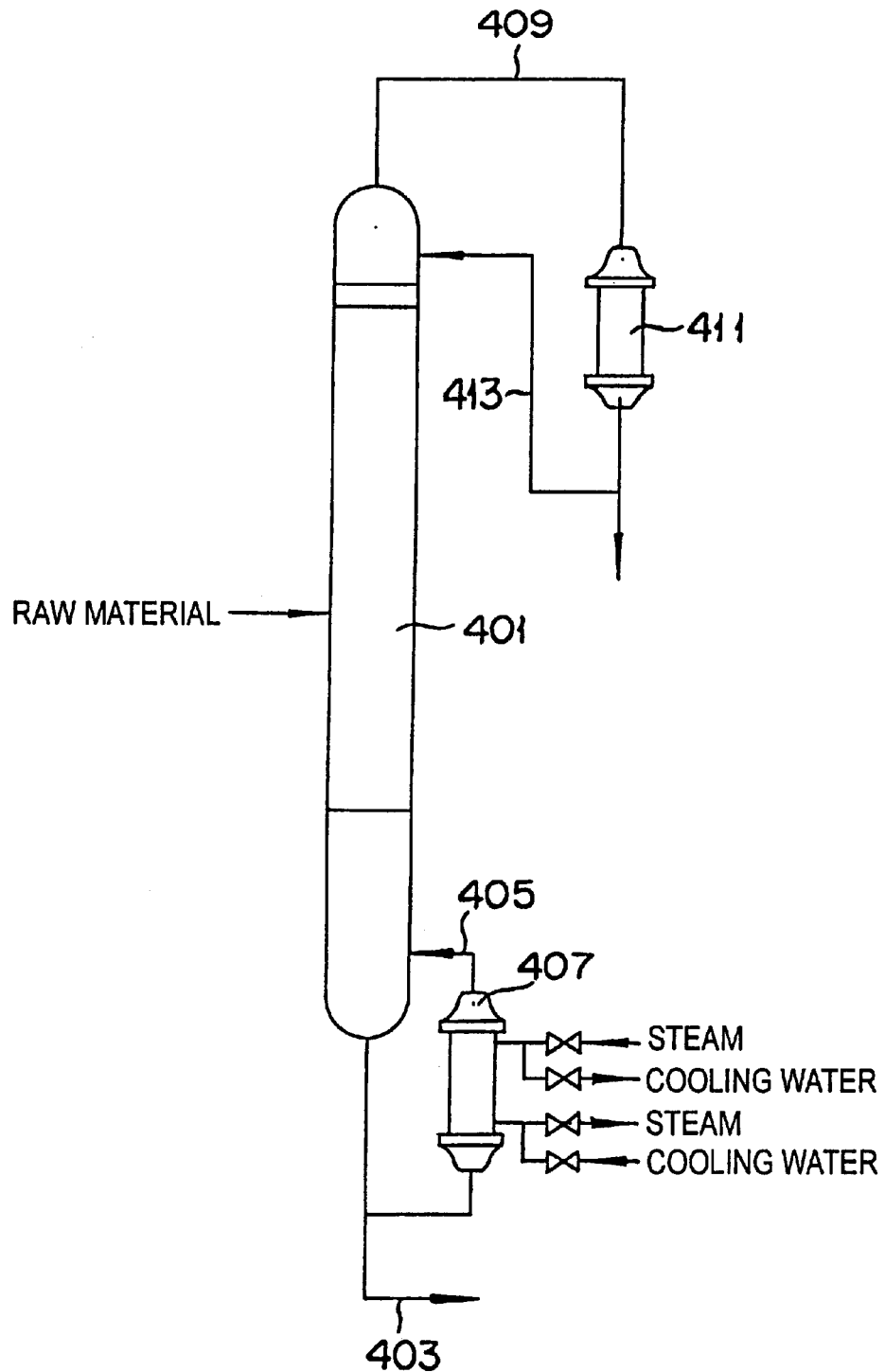
FIG. 4 is a schematic diagram illustrating one preferred mode of embodiment wherein a heat exchange constitutes the reboiler for a distillation column for the production of (meth)acrylic acid and/or a (meth)acrylic ester as one preferred embodiment of the method for using the devices contemplated by this invention.

FIG. 4 is a schematic diagram illustrating one preferred mode of embodiment of this invention which resides in a method for using devices, wherein the heating grade heat exchanger introducing the heating medium and using it for the purpose of heating the fluid to be handled therein is a reboiler of the distilling column for the production of (meth)acrylic acid and/or a (meth)acrylic ester.

The process for the production of (meth)acrylic acid and/or a (meth)acrylic ester is provided, as illustrated in FIG. 4, with an discharging line 403 intended to discharge the bottom liquid (residue) of a distilling column 401. This discharging line 403 is provided on the route thereof with the reboiling line 405 adapted to reboil the bottom liquid of the column and distilling it. This reboiling line 405 is provided thereon a reboiler 407 for heating to vaporize the bottom liquid of the column. Further, the distilling column 401 is provided with a recovering line 409 for recovering the distillate through the top of the column. This recovering line is provided on the route thereof with a condenser 411 for condensing to liquefy the distillate mentioned above. Further, a refluxing line 413 for refluxing part of the condensate liquefied by the condenser 411 to the distilling column 401. Incidentally, the reboiler 407 may be used in any of such forms as a vertical type, a horizontal type, a kettle, or a type used as inserted into the column interior.

The constructions of the heating medium (the steam in this case) inlet and outlet line for use during the course of a steady state of the reboiler 407 and the cooling medium (the cooling water in this case) inlet and outlet line for use during the course of the unsteady state, the method for using these line during the course of the steady state, and the method for using them during the course of the unsteady state are the same as the construction of the heater and the method for the use thereof explained with reference to FIG. 1 and FIG. 3 and, therefore, are omitted from the description offered herein.

Incidentally, in the process for the production of (meth) acrylic acid, it is a common practice to collect the (meth) acrylic acid formed in the reactor with a solvent and thereafter separating the (meth)acrylic acid and the solvent by means of distillation. Since the polymerizability is very high during the course of the separation, this invention proves to be particularly effective. That is, by introducing the cooling water in the place of the steam into the reboiler 407 connected to the distilling column (the solvent separating column), it is made possible to cool the contents (the liquids retained) of the distilling column 401 and the reboiler 407 quickly without entailing a reaction of polymerization. Particularly, when the reboiler is designed for forced circulation, the act of circulating the bottom liquid of the column through the reboiling line 405 even during the course of the unsteady state may well be rated as desirable in respect that the contents (liquids retained) can be wholly cooled quickly without entailing a reaction of polymerization.

This invention has been described thus far with reference to the diagrams depicting specific modes of embodiment. Despite this fact, this invention does not need to be restricted in any sense to these modes of embodiment. The alterations of the relevant conditions which are made without departure from the spirit of this invention are wholly within the scope of this invention.

The mode of embodiment shown in FIG. 2, for example, constitutes a case of connecting the cooling medium supplying and discharging line onto the route of the heating medium supplying and discharging line. In this invention, a cooling medium supplying and discharging line may be connected to the heating grade heat exchanger of the esterification reactor separately of the heating medium supplying and discharging line and used for the introduction of the cooling medium. Otherwise, as the heater, the external heating grade heat exchanger constructed as illustrated in FIG. 3 may be used instead of the heating jacket (the type directly set on the reactor) illustrated in FIG. 2. In this case, the heat exchanger is chiefly used not for the purpose of heating the raw material supplied thereto to a prescribed temperature but for the purpose of imparting the temperature necessary for the reaction of esterification of the raw material by means of heat exchange.

Experiments

Now, this invention will be described more specifically with reference to working examples of the invention.

EXAMPLE 1

A plant for producing acrylic acid, methyl acrylate, ethyl acrylate, butyl acrylate, 2-ethylhexyl acrylate, methacrylic acid, and methyl methacrylate met power failure while it was in operation. The plant was provided therein with an emergency power source in preparation for possible power failure. The following devices which were directly connected to the emergency power source remained fast in operation and prevented the relevant compounds in process of manufacture from polymerizing.

① Reboiler (refer to FIG. 4)

Through the steam passing nozzle of a reboiler 407 connected to a solvent separating column for acrylic acid and methacrylic acid, a cooling water having a temperature of 20° C. was introduced upward in a flow rate in the range of 100–250 m$^3$/h in the place of steam having a temperature of 164° C. The bottom pressure of the solvent separating column was 260–280 hPa. The introduction of the cooling water into the reboiler was stopped at the time that the temperature of the bottom liquid which was originally in the range of 95–125° C. fell to a level in the range of 50–60° C. The duration of this introduction was 6 hours. As a result, the circulating liquid was cooled without being polymerized. The cooling water admitted into the reboiler 407, because of the upward introduction, filled the reboiler 407 to the upper part and cooled the reboiler 407 quickly in its whole volume. Incidentally, the reboiler 407 was capable of quickly assuming the mode of use assigned for the unsteady state from that for the steady state, and fulfilling normal service during the course of a steady operation thereafter.

② Heater (refer to FIG. 3)

In reactors 301 intended to form methyl acrylate, ethyl acrylate, and methyl methacrylate (measuring 12 m$^3$, 47 m$^3$, and 45 m$^3$ in volume respectively) and provided with an external heater 305 intended for the raw material of reaction, a cooling water having a temperature of 20° C. was introduced upward through the steam passing nozzle of the heater 305 at a flow rate in the range of 10–30 m$^3$/h in the place of steam having a temperature of 133° C. On this occasion, a pump for circulating a liquid through the heater 305 and the reactor 301 was operated. The amount of the reaction solution circulated was in the range of 10–30 m$^3$/h and the initial internal pressure of the reactor was in the range of 0.1–0.15 MPa (gauge pressure). The introduction of the cooling water was stopped at the time that the temperature of the reaction solution in the range of 80–90° C. fell to 40° C. The duration of this introduction was 6 hours. As a result, the reaction solution was cooled without being polymerized. The cooling water admitted into the heater 305, owing to the upward introduction, filled the heater 305 to the upper part and quickly cooled the heater 305 in its whole volume. Incidentally, the heater 305 was capable of quickly assuming the mode of use assigned for the unsteady state from that for the steady state, and fulfilling normal service during the course of a steady operation thereafter.

③ Heating Jacket 205 (refer to FIG. 2): Mode not using an External Heater 243

In reactors 201 intended to form butyl acrylate and 2-ethylhexyl acrylate (measuring 30 m$^3$ and 20 m$^3$ respectively in volume) and provided with a heating jacket 205 and an agitator, a cooling water having a temperature of 20° C. was introduced upward through the steam passing nozzle of the heating jacket 205 at a flow rate of 50 m$^3$/h in the place of steam having a temperature of 164° C. On this occasion, the agitator continued to operate. The amounts of the reaction solution were respectively 25 m$^3$ and 15 m$^3$ and the initial internal pressures of the reactor were respectively 290 hPa and 90 hPa. The introduction of the cooling water was stopped at the time that the initial temperatures of the reaction solution, 850 and 90° C. fell to 50° C. The duration of this introduction was 6 hours. As a result, the reaction solution was cooled without being polymerized. The cooling water admitted into the heating jacket 205, owing to the upward introduction, filled the heating jacket 205 to the upper part and quickly cooled the heating jacket 205 in its whole volume. Incidentally, the heating jacket 205 was capable of quickly assuming the mode of use assigned for the unsteady state from that for the steady state, and fulfilling normal service during the course of a steady operation thereafter.

④ Heating Jacket 205 (refer to FIG. 2): Mode using an External Heater 243

In a reactor 201 (measuring 30 m$^3$ in volume) intended to form butyl acrylate and provided with a heating jacket 205 and an agitator, a cooling water having a temperature of 20° C. was introduced through the steam passing nozzle of the heating jacket 205 at a flow rate of 50 m$^3$/h in the place of steam having a temperature of 164° C. Then, a cooling water having a temperature of 20° C. was introduced upward at a flow rate of 50 m$^3$/h into an external heat exchanger 243 in the place of a heating medium having a temperature of 164° C. On this occasion, a solution of 30 kg of phenothiazine, an emergency quality polymerization inhibitor, in butanol was supplied to the reactor while agitating. By continuing the operation of the pump, the reaction solution was introduced into the heat exchanger 243 at a flow rate of 80 m$^3$/h. The amount of the reaction solution was 25 m$^3$ and the initial internal pressure of the reactor was 290 hPa. The introduction of the cooling water was stopped at the time that the initial temperature of the reaction solution, 85° C. fell to 22° C. The duration of this introduction was 6 hours. As a result, the reaction solution was cooled without being polymerized. The cooling water admitted into the heating jacket 205 and the external heater 243, owing to the upward introduction, filled them to their upper parts and quickly cooled the heating jacket 205 and the external heater 243 in their whole volumes. Incidentally, the heating jacket 205 was capable of quickly assuming the mode of use assigned for the unsteady state from that for the steady state, and fulfilling normal service during the course of a steady operation thereafter.

EXAMPLE 2

In an oxidation reactor intended for production of methacrylic acid and constructed as illustrated in FIG. 1, the reactor 101 was stopped as scheduled. As soon as the supply of the air (oxygen-containing gas) preheated to 205° C. during a steady state and of the raw material, methacrolein-containing gas, preheated to 285° C. was blocked, an inert gas (N$_2$) was introduced into the reactor 101 via the valve 108. Consequently, the gas entrapped in the reactor 101 not cooled yet was displaced with the inert gas. Thereafter, the heater 105 and the reactor 101 connected thereto were blown with the current of air generated by the compressor 161. Further, a cooling water having a temperature of 18° C. was supplied upward to the heater 105 at a flow rate of 50 m$^3$/h in the place of a steam having a temperature of 250° C. and a cold wind was passed through the reactor 101. In 24 hours, the reactor 101 could be cooled to the same temperature as the cold wind and enabled to secure safety. The cooling water admitted into the heater 105, owing to the upward introduction, filled the heater 105 to the upper part and quickly cooled the heater 105 in its whole volume. Incidentally, the heater 105 was capable of quickly assuming the mode of use assigned for the unsteady state from that for the steady state, and fulfilling normal service during the course of a steady operation thereafter.

COMPARATIVE EXAMPLE 1

In the same apparatus as used in Example 1, the conditions acquired by the apparatus in consequence of power failure were as follows when the apparatus was not connected to an emergency power source.

① Reboiler

The supply of the steam through the steam passing nozzle of the reboiler 407 connected to the solvent separating column handling acrylic acid and methacrylic acid was stopped. After the column was left standing for about two hours, an attempt was made to withdraw the bottom liquid of the column. Since the temperature of the column consequently fell barely to a level in the range of 93–122° C., the liquids retained in the column 401 and the reboiler 407 formed a polymer. Though an attempt was made to withdraw the liquids with a pump (not shown) disposed in the bottom of the column, the pump could not be operated because a polymer formed in the interior thereof.

② Heater

In the reactors 301 intended to form methyl acrylate, ethyl acrylate, and methyl methacrylate and provided with an external heater assigned to the raw material of reaction, when power failure happened, the apparatus kept the reaction solution intact and the heater 305 was not cooled but was retained in a state affected by thermal inertia. When the apparatus was left standing for about 2 hours, virtually no change was found in the temperature of the retained liquids. The reaction solution showed a discernible sign of the formation of a polymer. The detecting terminals of part of thermometers showed a discernible sign of deformation with the polymer.

③ Heating Jacket 205 (refer to FIG. 2): Mode not using an External Heater 243

(i) In the Case of a Process for the Production of Butyl Acrylate

In the reactor 201 intended to form butyl acrylate and provided with a heating jacket 205 and an agitator, the reactor 201 retained the reaction solution therein while the agitator was stopped and the heating jacket 205 was retained in a state effected by thermal inertia. In the production of butyl acrylate, the reaction solution showed a rise in temperature of about 11° C. A solution of 30 kg of phenothiazine as a polymerization inhibitor in butanol was injected through a hand hole. When the apparatus was left standing for about 2 hours, the temperature thereof ceased to rise. When the contents of the reactor were examined, the reaction solution showed a sign of the formation of a polymer and a sign of copious formation of impurities.

(ii) In the Case of a Process for the Production of 2-ethylhexyl Acrylate

In the reactor 201 intended to form 2-ethylhexyl acrylate and provided with a heating jacket 205 and an agitator, the reactor 201 retained the reaction solution therein while the agitator was stopped and the heating jacket 205 was retained in a state effected by thermal inertia. When the contents of the reactor were examined after the reactor had been left standing for about 2 hours, though the contents showed virtually no rise of temperature, the reaction solution showed a sign of the formation of a polymer and a sign of copious formation of impurities.

④ Heating Jacket 205 (refer to FIG. 2): Mode using an External Heater 243

(i) In the Case of a Process for the Production of Butyl Acrylate

In the reactor 201 intended to form butyl acrylate and provided with a heating jacket 205 and an agitator, the circulation of the reaction solution was stopped because the agitator stopped and the pump 231 stopped as well. The reactor 201 retained the reaction solution therein while the heating jacket 205 remained in a state affected by thermal inertia. In the production of butyl acrylate, the reaction solution showed a rise of temperature of about 13° C. A solution of about 30 kg of phenothiazine as a polymerization inhibitor in butanol was injected through a hand hole. When the contents of the reactor were examined after the reactor had been left standing for about 2 hours, the reaction solution showed a sign of the formation of a polymer and a sign of copious formation of impurities. Further, the pump 231 could not be operated because of the polymer and part of the heater 243 was blocked up with the polymer.

COMPARATIVE EXAMPLE 2

In the same oxidation reactor as in Example 2, the reactor 101 was stopped as scheduled. An inert gas ($N_2$) was introduced into the reactor 101 via the valve 108 at the same time that the supply of the air (oxygen-containing gas) and the methacrolein-containing gas was blocked. After the displacement of the gas entrapped in the reactor 101 with the inert gas was confirmed, the supply of the inert gas was stopped. When the reactor was left cooling for 3 days, the temperature of the reactor was barely lowered by about 50° C. Incidentally, the interior of the reactor 101 showed no sign of the presence of a polymer.

What is claimed is:

1. A method for using a heat exchanger for the purpose of heating a fluid to be handled comprising acrylic acid, methacrylic acid, esters thereof, oxygen, nitrogen, argon, carbon dioxide, propylene, isobutylene, and alcohol, comprising the steps of:

introducing a heating medium in the heat exchanger during a steady state for heating the fluid in the steady state; and introducing a cooling medium in the heat exchanger in the place of the heating medium during an unsteady state for cooling the fluid in the unsteady state.

2. A method according to claim 1, wherein said cooling medium is introduced through a path of said heat exchanger for the introduction of said heating medium.

3. A method according to claim 1, wherein said cooling medium is introduced upward into said heat exchanger.

4. A method according to claim 1, wherein said cooling medium is substantially in the same quality as said heating medium.

5. A method according to claim 1, wherein said heat exchanger comprises a heater and/or a reboiler.

6. A method according to claim 1, wherein said heat exchanger is a reactor for the production for a (meth)acrylic ester and/or a heat exchanger annexed thereto or a heat exchanger annexed to a reactor for the production of (meth)acrylic acid.

7. A method according to claim 1, wherein said heat exchanger is a reboiler for a solvent separating column operated in a step for the production of (meth)acrylic acid.

8. A method for preventing an easily polymerizing compound comprising acrylic acid, methacrylic acid, esters thereof from forming a polymer in a heating grade heat exchanger installed in an apparatus for handling the easily polymerizing compound, comprising the steps of:

introducing a heating medium in the heat exchanger during a stable state for beating said easily polymerizing compound in the stable state; and introducing a cooling medium into the heal exchanger in the place of the heating medium during an unstable state for cooling the easily polymerizing compound in the unstable state.

9. A method for cooling a fluid to be handled comprising acrylic acid, methacrylic acid, esters thereof, oxygen, nitrogen, argon, carbon dioxide, propylene, isobutylene, and alcohol in a heat exchanger having admitted a heating medium for the purpose of heating the fluid, characterized by introducing a cooling medium into the heal exchanger in the place of said heating medium during an unstable state.

* * * * *